(12) United States Patent
Scurtu et al.

(10) Patent No.: US 9,848,223 B2
(45) Date of Patent: Dec. 19, 2017

(54) AUTOMATICALLY DETERMINING RESTORED AVAILABILITY OF MULTI-CHANNEL MEDIA DISTRIBUTORS FOR AUTHENTICATION OR AUTHORIZATION

(71) Applicant: Adobe Systems Incorporated, San Jose, CA (US)

(72) Inventors: Tudor Scurtu, Jud. Neamt (RO); Robert Mares, Bucharest (RO); George Horia Galatanu, Lafayette, CA (US); Alexandru Popa, Arges (RO)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/070,053

(22) Filed: Mar. 15, 2016

(65) Prior Publication Data

US 2017/0272794 A1 Sep. 21, 2017

(51) Int. Cl.
*H04N 7/16* (2011.01)
*H04N 21/254* (2011.01)
*H04N 21/4627* (2011.01)
*H04N 21/262* (2011.01)

(52) U.S. Cl.
CPC ... *H04N 21/2541* (2013.01); *H04N 21/26225* (2013.01); *H04N 21/4627* (2013.01)

(58) Field of Classification Search
CPC .......... H04N 21/2541; H04N 21/4627; H04N 21/26225
See application file for complete search history.

(56) References Cited

U.S. PATENT DOCUMENTS

| | | | |
|---|---|---|---|
| 6,856,800 B1 | 2/2005 | Henry | |
| 2007/0209081 A1* | 9/2007 | Morris | H04N 7/17318 726/29 |
| 2010/0192212 A1 | 7/2010 | Raleigh | |
| 2011/0321132 A1 | 12/2011 | Van Slingerland | |
| 2015/0095455 A1* | 4/2015 | Spitz | H04L 67/02 709/217 |
| 2015/0350186 A1* | 12/2015 | Chan | H04L 63/083 726/9 |
| 2016/0127212 A1* | 5/2016 | Guminy | H04L 43/08 709/224 |

* cited by examiner

Primary Examiner — Joshua Taylor
(74) Attorney, Agent, or Firm — Kilpatrick Townsend & Stockton LLP

(57) ABSTRACT

Methods and systems are provided for automatically identifying restored availability of multi-channel media distributors for authentication or authorization. For example, during a period of reduced availability for a multi-channel media distributor, the entitlement service diverts some or all requests from reaching the multi-channel media distributor. These requests are for programmers associated with the multi-channel media distributor to provide media content to user devices. The entitlement service subsequently transmits test requests to the multi-channel media distributor. The entitlement service determines that the multi-channel media distributor has authenticated user credentials included in the test requests or has authorized content access based on the test requests. Based on this determination, which indicates that the availability of the multi-channel media distributor has been restored, the entitlement service transmits subsequent authentication or authorizations requests to the multi-channel media distributor.

17 Claims, 9 Drawing Sheets

AUTOMATICALLY DETERMINING RESTORED AVAILABILITY OF MULTI-CHANNEL MEDIA DISTRIBUTORS FOR AUTHENTICATION OR AUTHORIZATION

CROSS-REFERENCE TO RELATED APPLICATIONS

This application is related to concurrently-filed U.S. patent application Ser. No. 15/070,025, entitled "Automatically Identifying Availability of Multi-Channel Media Distributors for Authentication or Authorization," which is incorporated by reference herein in its entirety.

TECHNICAL FIELD

This disclosure relates generally to computer-implemented methods and systems and more particularly relates to automatically determining restored availability of multi-channel media distributors for authentication or authorization.

BACKGROUND

A multi-channel media distributor, such as a cable company or other multichannel video programming distributor, provides media content for multiple television channels or other media channels to subscribers over dedicated networks. The individual media content offered to subscribers is typically provided by numerous, different programmers or other content providers. For example, a typical multi-channel media distributor offers 100 or more television channels from 50 or more different programmers and delivers the television content for all of those channels through cable or telephone wires to the homes of its subscribers.

As use of the Internet and mobile computing devices has grown, viewers have begun to seek programmer video channels through the Internet, on mobile phones, and by directly looking for media programmer provided content outside of the dedicated multi-channel media distributor networks. For example, a given viewer will have a subscription with a cable television company, multi-channel media distributor A, and be able to watch a local football game on his home television on channel B, which is provided by media programmer B.

Existing systems allow the viewer to also watch the football game and other channel content even when the viewer is not at home (and thus cannot access the multi-channel media distributor dedicated network) or when the viewer uses a mobile device rather than a television to view media content from one or more channel. In these systems, a multi-channel media distributor acts as an identity provider for end users by authenticating users on behalf of programmers, verifying that authenticated users are authorized to access certain content provided by programmers, or both. In an authentication operation, the multi-channel media distributor verifies that a user has presented valid credentials for a given programmer in response to the user's computing device attempting to view or otherwise access an online resource (e.g., a TV channel) on the programmer's web site. In an authorization operation, the multi-channel media distributor verifies that the authenticated credentials are entitled to access a particular resource provided by the programmer. For example, a viewer accesses a website or mobile device app provided by media programmer B, and programmer B provides the video directly to the viewer through the Internet after authenticating the viewer and confirming that the viewer's access to the video is consistent with the viewer's subscription to the multi-channel media distributor. Specifically, programmer B provides the video based on checking with the multi-channel media distributor to authenticate the viewer's subscription, to confirm that the viewer is authorized to receive the particular video content (e.g., the football game), or both.

Existing systems involving multi-channel media distributors and programmers may not adequately respond when problems arise with the multi-channel media distributor authentication and authorization. For example, during periods of high-traffic for a provider (e.g., breaking news or the beginning of a sporting event), multi-channel media distributor servers are sometimes overwhelmed with requests to authenticate viewers or verify that the viewers are authorized to access content from the programmers. The multi-channel media distributors are often not able to process requests due to having to process the extreme volume in such circumstances and the result is that many viewers do not have access to the videos at all or end up experiencing long delays without having access to the videos.

SUMMARY

Embodiments are provided for automatically determining a restored availability of multi-channel media distributors for authentication or authorization after a period of reduced availability. In some embodiments, an entitlement service communicates with a multi-channel media distributor (e.g., a cable provider) to authenticate viewers requesting content from programmers, such as providers of videos or other media content on a channel, or to confirm that authenticated viewers are authorized to receive content from the programmers. Because the entitlement service is positioned between multiple programmers and the multi-channel media distributor, the entitlement service can determine whether the multi-channel media distributor that has recently experienced reduced availability has been restored to normal operation.

For example, during a period of reduced availability for a multi-channel media distributor, the entitlement service diverts some or all requests from reaching the multi-channel media distributor. These requests are for programmers associated with the multi-channel media distributor to provide media content to user devices. Diverting these requests may involve the entitlement service providing temporary access to the media content without involving the multi-channel media distributor. The entitlement service subsequently transmits test requests to the multi-channel media distributor. The test requests may be, for example, authorization or authentication requests with credentials known to be valid, which should result in a successful authentication or authorization event by the multi-channel media distributor. The entitlement service then determines that the multi-channel media distributor has authenticated user credentials included in the test requests or has authorized content access based on the test requests. Based on this determination, which indicates that the availability of the multi-channel media distributor has been restored, the entitlement service transmits subsequent authentication or authorizations requests to the multi-channel media distributor.

These illustrative features are mentioned not to limit or define the disclosure, but to provide examples to aid understanding thereof. Additional embodiments are discussed in the Detailed Description, and further description is provided there.

DETAILED DESCRIPTION

Figure 1:
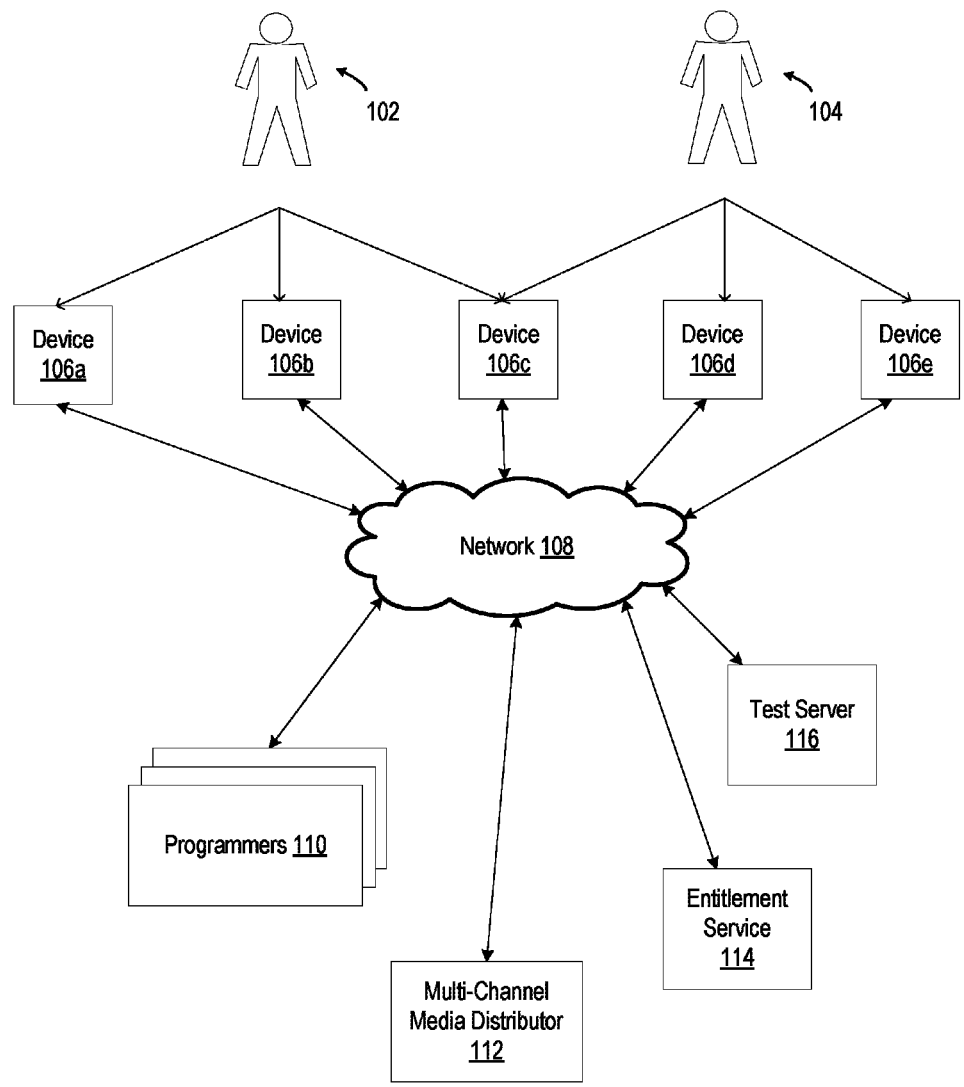
FIG. 1 is a block diagram depicting an example of a system in which exemplary users receive video from a programmer over a network.

As discussed above, existing systems, in which multi-channel media distributors provide authentication or authorization functions for media programmers, may experience reduced availability of a multi-channel media distributor. During this period of reduced availability, the entitlement service can provide temporary access to programmers' content, but doing so may not properly enforce access controls to this content. To expedite the resumption of normal operation in which the multi-channel media distributor enforces appropriate access controls, embodiments are disclosed that automatically identify reduced availability of multi-channel media distributors for authentication or authorization. For example, an entitlement service, which is positioned in a data network between programmers and a multi-channel media distributor, first uses test requests sent to the multi-channel media distributor to determine if it has become available again. The entitlement service then gradually increases the number of requests that are routed to the multi-channel media distributor to ensure that the multi-channel media distributor can resume normal operation without experiencing another reduction in availability.

The following example is provided to introduce certain embodiments of the present disclosure. In some embodiments, an entitlement service, during normal operation, communicates received requests for programmers to provide media content to user devices and then transmits those requests to a multi-channel media distributor. If the multi-channel media distributor experiences reduced availability for servicing authorization or access requests (e.g., due to a sharp increase in traffic to a programmer's site), the entitlement service diverts some or all authorization or access requests from reaching the multi-channel media distributor. For example, while the multi-channel media distributor is unavailable, the entitlement service enables content access by user devices that temporarily allow the user devices (e.g., by providing temporary versions of access tokens that would typically be provided to user devices after authentication or authorization by the multi-channel media distributor). To resume normal operation of the multi-channel media distributor as soon as possible, the entitlement service transmits test requests to the multi-channel media distributor.

The test requests are used to determine whether the multi-channel media distributor is available. For example, the test requests include credentials that are known to be valid by the entitlement service, and that should therefore result in a successful authentication or authorization event. If the entitlement service determines that transmitting the test requests to the multi-channel media distributor has resulted in a successful authentication or authorization event, the entitlement service ceases diverting at least some subsequent authorization or authentication requests. For example, the entitlement service may transmit at least 10% of the received authorization or authentication requests to the multi-channel media distributor after the test requests have indicated that the multi-channel media distributor is available. If a sufficient number of the authorization or authentication requests result in successful authentication or authorization events by the multi-channel media distributor, the entitlement service gradually increments the percentage of subsequent authorization or authentication requests that are transmitted to the authorization or authentication requests.

As used herein, the term "programmer" refers to a person or business entity, or the electronic devices operated by the person or business entity, that provides video content or other media content made available on one or more channels provided by one or more multi-channel media distributors. In one example, a programmer is an entity that creates content, organizes content, or otherwise makes content available for multiple media channels (e.g., television channels). Programmers also make their media content available to users via networks other than the dedicated networks of the multi-channel media distributors. In one example, a programmer publishes a mobile device application for installation on client devices that accesses video content from the programmer directly for display on the mobile devices. In another example, a programmer publishes a website that includes a plugin or other component that accesses video content from the programmer directly for display on client devices.

As used herein, the term "media content" refers to time-based video content, audio content, or some combination thereof that is playable on a television or other electronic device. In one example, a video is provided over a network as a file that is saved locally on a client device for subsequent playback. In another example, video is streamed over a network for playback on the client device. A variety of types of electronic devices play back the video for a user. As examples, any of a television, desktop computer, laptop, mobile phone, mobile computing device, tablet, Internet-of-things device, automobile electronic system, or any other electronic device having display or audio capabilities to display graphics or play sound can be used to play a streamed or downloaded video.

As used herein, the term "user" refers to a person, or a device operated by the person, that requests or receives downloaded or streamed videos from a programmer or multi-channel media distributor. A user has a subscription with a multi-channel media distributor in some embodiments. In some embodiments, a user uses a mobile device with multiple apps that access publishers to receive and view videos based on subscription credentials for a multi-channel media distributor that separately provides videos to the user through a separate dedicated network.

As used herein, the term "subscription" refers to a user having an account to receive television or other videos for multiple channels from a multi-channel media distributor. A subscription in some embodiments is time-based. For example, a user pays a monthly fee to receive television content from a multi-channel media distributor cable company at the user's residence. In another embodiment, the user pays a monthly fee to access videos from multiple sources through the Internet and also uses the Internet to access additional videos directly from programmers through the Internet.

As used herein, the term "multi-channel media distributor" refers to a service that distributes videos or other media content for multiple channels from one or more programmers to multiple users. A multi-channel media distributor typically provides videos based on user subscriptions and to users via a dedicated network. For example, a cable company provides multi-channel television videos over a cable network.

As used herein, the term "authenticate" refers to determining that a user is associated with a particular identity, account, or subscription maintained by a multi-channel media distributor. Authenticating a user is based on a user name and password provided by the user in some embodiments.

As used herein, the term "authorized" refers to a user having permission based on the user's identity, account, or subscription with a multi-channel media distributor to access a particular video. An authenticated user will have authorization to access some videos, but not other videos in one example.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

Referring now to the drawings, FIG. 1 is a block diagram depicting an example of a system in which users 102, 104 attempt to receive video or other media content from one or more programmers 110 over one or more data networks 108. In this example, the user 102 accesses the data network 108 with user devices 106a-c, and the user 104 accesses the data network 108 with user devices 106c-e. It is possible for users to use any number of devices and for each device to be shared by any number of users.

In this example, the users 102, 104 have subscriptions to receive television or other media content from a multi-channel media distributor 112 through a dedicated network (not shown). The users 102, 104 access media content (e.g., videos) on one or more of devices 106a-e by contacting one or more programmers 110. Computing devices associated with the programmers 110 provide the requested media content if the subscriptions of the users are authenticated and the authorization for the particular media content is confirmed with the multi-channel media distributor 112.

In this example, an entitlement service 114 is used to authenticate the subscriptions and confirm the authorizations. The entitlement service 114, which includes suitable program code executed by one or more processing devices, communicates with the multi-channel media distributor 112 via one or more data networks 108. The entitlement service 114 receives requests for media content from one or more of the programmers 110, one or more of the user devices 106a-e, or both via the data network 108. The entitlement service 114 transmits the requests (or data derived from the requests) to the multi-channel media distributor 112, which performs authentication or authorization operations for various user devices on behalf of the programmers 118.

In some circumstances, the multi-channel media distributor 112 is unavailable (or experiences reduced availability) for performing these authentication or authorization functions. For example, the responsiveness of the multi-channel media distributor 112 may be degraded if a high volume of user devices request authentication or authorization during high-traffic events, such as live events, breaking news, and other videos that draw a large audience. In these circumstances, the entitlement service 114 determines that temporary access should be granted to one or more of the requesting user devices 106a-e.

In some embodiments, the entitlement service 114 determines that the responsiveness of the multi-channel media distributor 112 has degraded (i.e., that the multi-channel media distributor 112 is experiencing reduced availability) based on comparing a current responsiveness of the multi-channel media distributor 112 to a historic responsiveness of the multi-channel media distributor 112. In one example, as described herein, if the multi-channel media distributor 112 fails to authenticate or authorize 50% of requests received over the last hour to provide access to media content from the programmers 110, the entitlement service 114 compares the 50% success rate to one or more historical success rates indicating how frequently the multi-channel media distributor 112 authenticates users or authorizes content access by authenticated users. If a historical success rate is 80%, the 50% success rate over the last hour (or other suitable interval) indicates a lack of responsiveness by the multi-channel media distributor 112.

In some embodiments, the entitlement service 114 generates or uses test requests (e.g., artificially generated traffic) to verify the responsiveness of the multi-channel media distributor 112, as described herein. For example, the entitlement service 114 communicates with a test server 116 to generate test requests for authentication or authorization. The test server 116 sends these test requests to the entitlement service 114 via the data network 108. The test requests include test credentials, which are known to be valid, to verify the responsiveness of the multi-channel media distributor 112. If the entitlement services 114 transmits the test requests to the multi-channel media distributor 112 and the transmitted requests do not result in a successful authentication or authorization, the entitlement service 114 determines that the multi-channel media distributor 112 is experiencing reduced availability as opposed to, for example, simply rejecting a large number of invalid requests from users. In additional or alternative embodiments, a separate test server 116 may be omitted, and the same server or computing device can execute both the entitlement service 114 and a test service that generates test requests.

In some embodiments, the entitlement service 114 determines whether this temporary access should be continued by determining if the multi-channel media distributor 112 is available again. For example, the entitlement service 114 may request responses from multi-channel media distributor 112 after providing temporary access to user devices during a period of limited availability for the multi-channel media distributor 112. If a response is received, the entitlement service 114 determines, based on the response, whether to continue allowing the programmer 110 to provide media content or to cause the programmer 110 to terminate the provision of the media content. For example, if a response from the multi-channel media distributor indicates that the user 102 is not authorized to watch a video that is being streamed based on a temporary grant of access, the entitlement service 114 will instruct the programmer 110 to cut off the streaming of the video.

Figure 2:
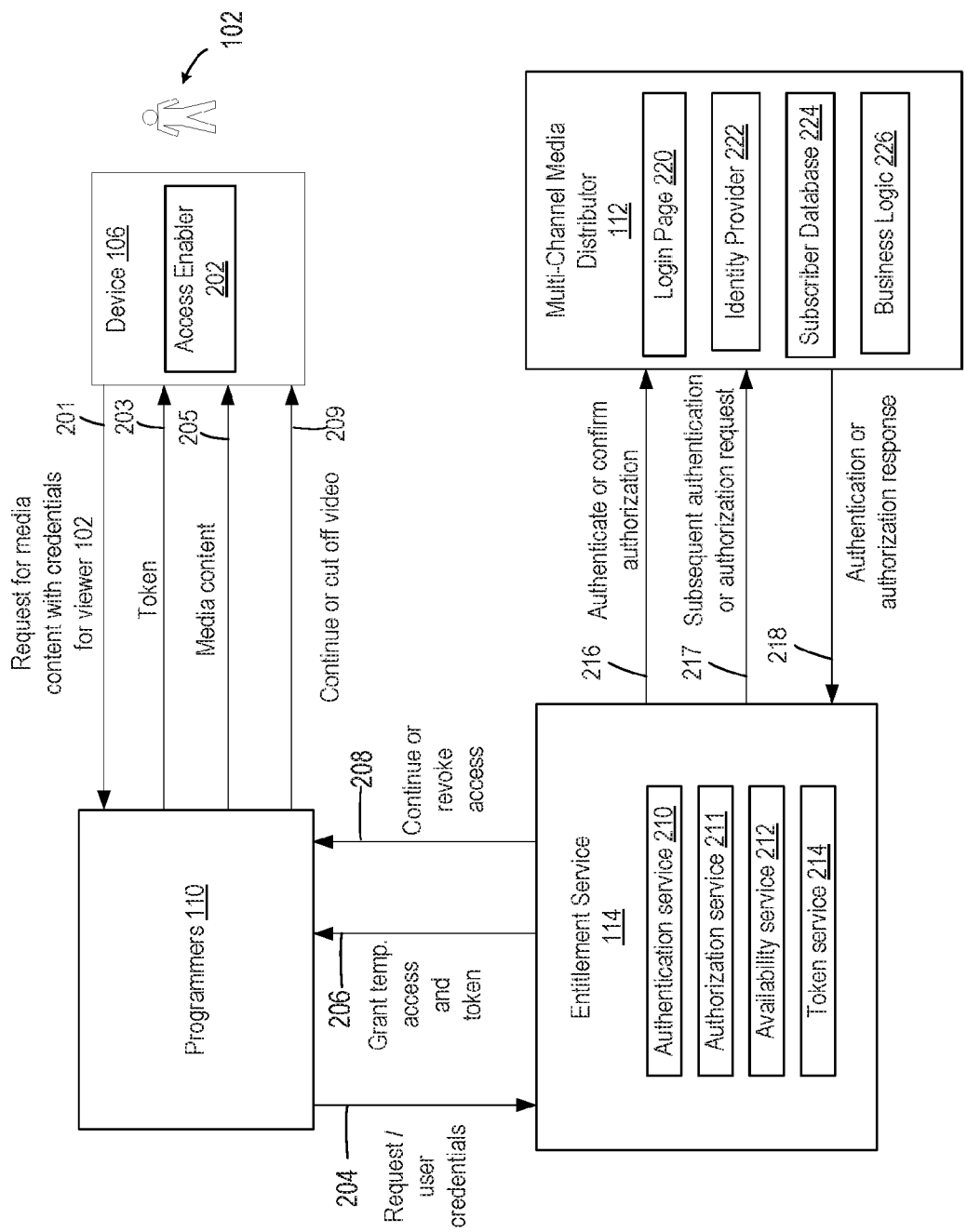
FIG. 2 is a block diagram illustrating communication between user devices, programmer devices, an entitlement service, and a multi-channel media distributor.

FIG. 2 is a block diagram illustrating communication between user devices, a programmer 110, an entitlement service, and a multi-channel media distributor backend. FIG. 2 illustrates an access enabler 202 executed on the user device 106, which is representative of any of the devices 106a-e depicted in FIG. 1. The programmer 110 interacts with the entitlement service 114 and the access enabler 202, which allows users to be authenticated, authorized, or both when attempting to access media content provided by the programmer 110. For example, the access enabler 202 facilitates exchanges of entitlement data (e.g., authentication data, authorization data, etc.) between the user device 106 and the multi-channel media distributor 112 by communicating entitlement data to the programmer 110, which in turn provides the entitlement data to the entitlement service 114. The entitlement service 114 also facilitates authentication and authorization confirmation interactions based on information received from the programmer 110.

The access enabler 202 is executed locally on the user device 106. The access enabler 202 executes in the background (e.g., in a manner invisible to the user) to authenticate and confirm authorization of the user for requested videos. For example, the user 102 accesses the website or application of the programmer 110 and thereby requesting a video or other media content. The access enabler 202 on the user device 106 transmits, based on the user 102 requesting the video or other media content, relevant user data or device data to a computing device associated with the programmer 110.

In FIG. 2, the programmer 110 receives a request, in an electronic message 201, for a media content from the user device 106 via a data network. The access enabler 202 facilitates this communication between the user device 106 and one or more programmers 110. The request identifies a name and password for the user 102 that identify an identity, account, or other subscription information for the user 102 to the multi-channel media distributor 112. In additional or alternative embodiments, other suitable credentials are used to identify the user 102 to the multi-channel media distributor 112. The programmer 110 sends, in an electronic message 204, the request and credentials to the entitlement service 114. The programmer 110 transmits this communication based on, for example, being configured to authenticate and authorize users with the entitlement service 114.

The entitlement service 114 includes an authentication service 210, an authorization service 211, an availability service 212, and a token service 214. The entitlement service 114 uses these sub-services to access the multi-channel media distributor 112 over one or more data networks. The entitlement service 114 accesses the multi-channel media distributor 112 to authenticate users requesting content from the programmers. In some embodiments, accessing the multi-channel media distributor 112 involves accessing the multi-channel media distributor 112 to authenticate that the user has a subscription with the multi-channel media distributor 112 or confirm that the user is authorized to receive the media content from one or more programmers 110. Additionally or alternatively, the entitlement service 114 accesses the multi-channel media distributor 112 to confirm that authenticated users are authorized to receive media content from one or more of the programmers 110.

In some embodiments, the authentication service 210 and the authorization service 211 generate, based on the entitlement service 114 receiving the message 204, an electronic message 216 that includes a request for the multi-channel media distributor 112 to authenticate the user 102. For example, the message 216 may be used to request, instruct, or otherwise cause the multi-channel media distributor 112 to determine whether the user name and password match those of an authorized user identify, account, or subscription maintained by the multi-channel media distributor 112 or an accessible third party. For example, transmitting the message 216 involves accessing a login page 220 and providing the user name and password (or other suitable credentials) to attempt a login.

In one example, the multi-channel media distributor 112 uses an identity provider module 222 that confirms the identity of the user with a third-party identity service. In another example, the multi-channel media distributor 112 uses a subscriber database 224 to determine whether the user 102 is an authenticated user with a subscription to the multi-channel media distributor 112.

In some embodiments, the message 216 also identifies the video or other media content requested by the user 102, the programmer 110, or both. This identification allows the multi-channel media distributor 112 to determine whether the user 102 is authorized to access the particular video or to access videos from the particular programmer 110. For example, if a subscription for the user 102 does not include a premium movie channel, the multi-channel media distributor 112 will not authorize the user to have access to movies provided by the premium movie channel programmer 110.

In some embodiments, the multi-channel media distributor 112 also executes business logic 226 that includes business rules for making authentication and authorization determinations. In one example, the business rules identify which videos are available for different subscription classes, pay-per-view requirements for particular videos, and other business rules useful in controlling user authentication, authorization, or both.

In the example shown in FIG. 2, the availability service 212 of the entitlement service 114 determines that the entitlement service 114 does not receive an immediate response to message 216 from multi-channel media distributor 112. After a predetermined amount of time passes, the availability service 212 determines that the multi-channel media distributor 112 is unable to provide a timely response. Based on this determination, the entitlement service 114 provides or otherwise facilitates temporary access for the user 102 to media content from programmer 110.

In some embodiments, under normal operating conditions (e.g., the multi-channel media distributor 112 responding to requests from the entitlement service 114), the entitlement service 114 generates a token using a token service 214 and transmits, to the programmer 110 via a data network, the token in an electronic message 206. During these normal operating conditions, the entitlement service 114 generates the token based on receiving confirmation of authentication, authorization, or both from the multi-channel media distributor 112. The programmer 110 sends an electronic message with the token and streams or otherwise sends media content to the user device 106.

However, if the availability service 212 determines that the multi-channel media distributor 112 is unable to provide a timely response, the entitlement service 114 uses the token service 214 to grant temporary access. For example, the token service 214 generates a token without the entitlement service 114 receiving confirmation of authentication or authorization from the multi-channel media distributor 112. In this case, as depicted in FIG. 2, the programmer 110 sends an electronic message 203 with the token and streams or otherwise sends the media content 205 (e.g., a video) to the user device 106. The user 102 is thus able to view the media content 205 while the multi-channel media distributor 112 is unavailable.

In some embodiments, the token in the message 201 includes a time-to-live or other appropriate parameter based on preferences of the programmer 110. For example, a short time-to-live parameter is included if the programmer 110 desires tighter control of the video. Such control may include, for example, requiring the user to request access again at the conclusion of the time-to-live period.

After the multi-channel media distributor 112 becomes available again, the multi-channel media distributor 112 transmits a subsequent message 218 with information identifying whether the user 102 is authenticated or authorized to access the particular media content 205 from the particular programmer 110. For example, since a message 216 sent during a period of reduced availability is lost, the entitlement service 114 sends a subsequent message 217 regarding a user's access rights (e.g., a request for authentication, authorization, or both). The multi-channel media distributor 112 responds to the message 217 by transmitting the message 218. Based on this subsequent message 218, the entitlement service 114 sends an electronic message 208 to the programmer 110 to continue access or revoke access to the media content 205.

The programmer 110, based on receiving the message 208, sends an electronic message 209 to the device 106 with instructions to continue access to the media content 205 or terminate the access to the media content 205. In one example, the message 209 may extend the time-to-live on the token included in the message 203. In another example, the message 209 may include a new access or revocation token with parameters configured to allow the media content 205 to continue to completion or to terminate playback of the media content 205. In the case of streaming of the media content 205, the programmer 110 will stop streaming the media content 205 if the message 208 indicates that access by the user 102 to the media content 205 should be revoked or otherwise terminated.

In some embodiments, the access enabler 202 illustrated in FIG. 2 provides a modular solution for implementing authentication and authorization by a multi-channel media distributor with sophisticated degradation capabilities in the programmer's application and website. In some embodiments, the access enabler 202 is configured to execute locally on device 106 of the user 102, for example, as a plugin within a native application or web page provided by the programmer 110. The access enabler 202 on the user device 106 interacts with the programmer 110 device to handle programmer-configured entitlement workflows in a flexible and secure manner.

In some embodiments, computing devices associated with the programmer 110 are used to create and maintain the higher-level web pages or native applications that implement a user software interface for viewing media content. Appropriate functionality is incorporated into these web pages or native applications to implement the authentication and authorization using the multi-channel media distributor 112. The programmer 110, in some embodiments, specifies appropriate interactions using an asynchronous system of functions and callbacks defined by an Application Programming Interface ("API"). Examples of entitlement flows that are easily implemented using such an API include, but are not limited to, setting the programmer identity, checking or obtaining user authentication against a particular identity provider, checking or obtaining user authorization for a particular video or from a particular programmer, and logging out the user.

In some embodiments, if the multi-channel media distributor 112 is unavailable, the entitlement service 114 is used to bypass authentication or authorization verifications by the multi-channel media distributor 112. The entitlement service 114 instead provides temporary access to media content by a user for a set period of time or until the multi-channel media distributor 112 is determined to again be available. The result is that the user is not blocked from accessing video content that they should otherwise (absent the multi-channel media distributor system unavailability) be able to access. The entitlement service 114 may determine that the multi-channel media distributor 112 is back online, and then resume normal operations in which requests for authentication or confirmation are serviced by the multi-channel media distributor 112.

Determining Restored Availability of a Multi-Channel Media Distributor

Figure 3:
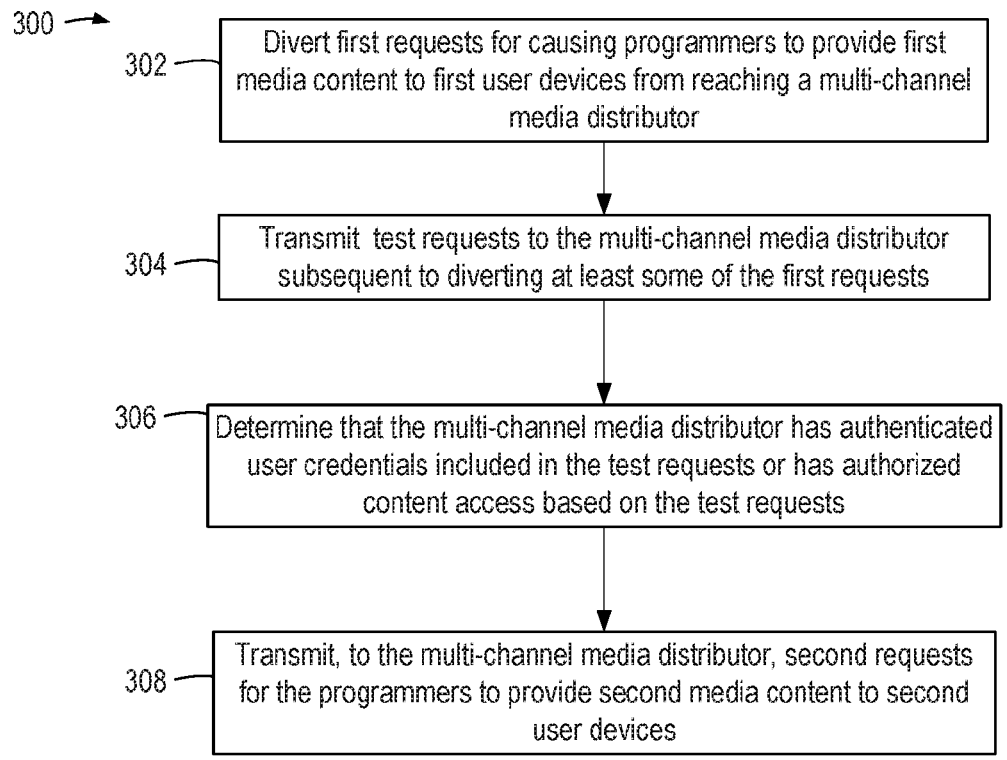
FIG. 3 is a flow chart depicting an example of a process for determining a restored availability of the multi-channel media distributor.

The entitlement service 114 executes one or more suitable algorithms for determining that the availability (e.g., the responsiveness) of the multi-channel media distributor for authentication or authorization has been restored. For example, FIG. 3 is a flow chart depicting an example of a process 300 for determining a restored availability of the multi-channel media distributor 112. In some embodiments, one or more processing devices implement operations depicted in FIG. 3 by executing suitable program code (e.g., the entitlement service 114 and the availability service 212). For illustrative purposes, the process 300 is described with reference to the examples depicted in FIGS. 1 and 2. Other implementations, however, are possible.

At block 302, the process 300 involves diverting first requests, which are used to cause programmers associated with a multi-channel media distributor to provide first media content to first user devices, from reaching the multi-channel media distributor. For example, at least one processing device executes the entitlement service 114 to divert the first requests. The entitlement service 114 determines that the requests are addressed to the multi-channel media distributor 112 and that the requests are intended for authenticating user devices or verify that the user devices are authorized to access media content. The entitlement service 114 prevents at least some of these requests from being transmitted to the multi-channel media distributor 112. The entitlement service 114 responds to receiving the requests by providing the associated user devices with temporary access to media content from the programmers 110. Examples of providing user devices with temporary access are described herein with respect to FIGS. 7 and 8.

At block 304, the process 300 involves transmitting, subsequent to diverting at least some of the first requests, test requests from the entitlement service to the multi-channel media distributor. For example, at least one processing device executes the entitlement service 114 and thereby configures a suitable network interface device to transmit the test requests to the multi-channel media distributor 112.

In some embodiments, the test requests include one or more of test authentication credentials and test authorization credentials that are valid for the multi-channel media distributor. These test credentials are generated using the entitlement service 114 specifically for verifying the responsiveness of the multi-channel media distributor 112. The test credentials are not used by any user devices 106 for requesting access to media content. Because the entitlement service 114 knows that these test credentials are valid, an unsuccessful authentication or authorization after transmitting the test requests with these credentials indicates a lack of availability by the multi-channel media distributor 112 rather than an invalid credential.

In some embodiments, the entitlement service 114 causes a test service to generate and send the test requests. In some embodiments, the test service is executed on a test server 116 that is accessible by the entitlement service 114 via a data network. The availability service 212 of the entitlement service 114 generates an instruction message for the test server 116 to generate and transmit the test requests to the entitlement service 114. The entitlement service 114 transmits the instruction message to the test server 116 via one or more data networks 108. In other embodiments, the test service is executed on a computing system that also executes the entitlement service 114. The availability service 212 of the entitlement service 114 instructs the test service to generate the test requests and provide the test requests to the entitlement service 114.

In additional or alternative embodiments, these test credentials are user credentials associated with one or more users 102, 104. For example, the entitlement service 114 receives user credentials with a first set of requests for access to media content. The entitlement service 114 provides temporary access to the media content, regardless of any authentication or authorization by the multi-channel media distributor 112, based on receiving the first set of requests. The entitlement service 114 also selects a subset of these requests as test requests.

In some embodiments, this subset is selected based on the entitlement service 114 recently receiving successful authentication or authorization messages from the multi-channel media distributor 112 in response to submitting other requests with the same user credentials. For example, if a request includes credentials that successfully resulted in authentication or authorization when transmitted to the multi-channel media distributor 112 in the last day, the last hour, or some other threshold time period, the request may be included in the selected subset of test requests. In additional or alternative embodiments, the subset of requests is selected for inclusion in the test requests even if the entitlement service 114 lacks information about the validity of credentials included in the selected requests.

At block 306, the process 300 involves determining that the multi-channel media distributor has authenticated user credentials included in the test requests or has authorized content access based on the test requests. For example, at least one processing device executes the entitlement service 114 to determine whether transmitting the test requests to the multi-channel media distributor 112 results in receiving one or more messages from the multi-channel media provider indicating a successful authentication or authorization.

At block 308, the process 300 involves transmitting, from the entitlement service to the multi-channel media distributor, second requests for the programmers to provide second media content to second user devices. The second requests are transmitted based on determining that the multi-channel media distributor has authenticated the user credentials or has authorized the content access. For example, at least one processing device executes the entitlement service 114 and thereby configures a suitable network interface device to transmit the second requests to the multi-channel media distributor 112. The second requests are generated based from communications between programmers 110 and the access enabler 202 that result from a user requesting access to media content.

In some embodiments, the second requests transmitted by the entitlement service 114 include fewer than all requests for access to media content that are received by the entitlement service 114. For example, subsequent to successful authentication or authorization resulting from test requests, the entitlement service 114 receives additional requests for authenticating users or providing content access for authenticated users. The entitlement service 114 transmits a first percentage of the requests to the multi-channel media distributor 112, and diverts any other requests (e.g., by continuing to provide temporary access to requested media content). If a threshold number of the first percentage of requests results in authentication or authorization, the entitlement service 114 transmits a second percentage of subsequent requests to the multi-channel media distributor 112, where the second percentage is larger than the first percentage. If a threshold number of the second percentage of requests results in authentication or authorization, the entitlement service 114 transmits a third percentage of subsequent requests to the multi-channel media distributor 112, where the third percentage is larger than the second percentage. In this manner, the entitlement service 114 iteratively decreases the number or percentage of requests being diverted and, if each iteration results in a sufficient number of authentications or authorizations, ceases iteration once all requests are being transmitted to the multi-channel media distributor 112.

In additional or alternative embodiments, the entitlement service 114 uses copies of received requests to determine the availability of the multi-channel media distributor 112. These copied requests transmitted by the entitlement service 114 correspond to fewer than all requests for access to media content that are received by the entitlement service 114. For example, subsequent to successful authentication or authorization resulting from test requests, the entitlement service 114 receives additional requests for authenticating users or providing content access for authenticated users. The entitlement service 114 continues to provide temporary access to requested media content in response to these requests (i.e., without requiring the involvement of the multi-channel media distributor 112). The entitlement service 114 uses the copies of these requests to determine whether the availability of the multi-channel media distributor 112 has been restored.

For example, for a certain percentage of the requests, the entitlement service 114 creates copies of the requests and transmits this first percentage of copied requests to the multi-channel media distributor 112. If a threshold number of the first percentage of copied requests results in authentication or authorization, the entitlement service 114 repeats the copy-and-transmit process with a second percentage of subsequently received requests, where the second percentage is larger than the first percentage. If a threshold number of the second percentage of copied requests results in authentication or authorization, the entitlement service 114 repeats the copy-and-transmit process with a third percentage of subsequently received, where the third percentage is larger than the second percentage. The entitlement service 114, in response to a sufficient percentage of transmitted copies of requests resulting in successful authentication or authorization events, ceases the copy-and-transmit process and resumes relying on the multi-channel media distributor 112 when providing content access.

Figure 4:
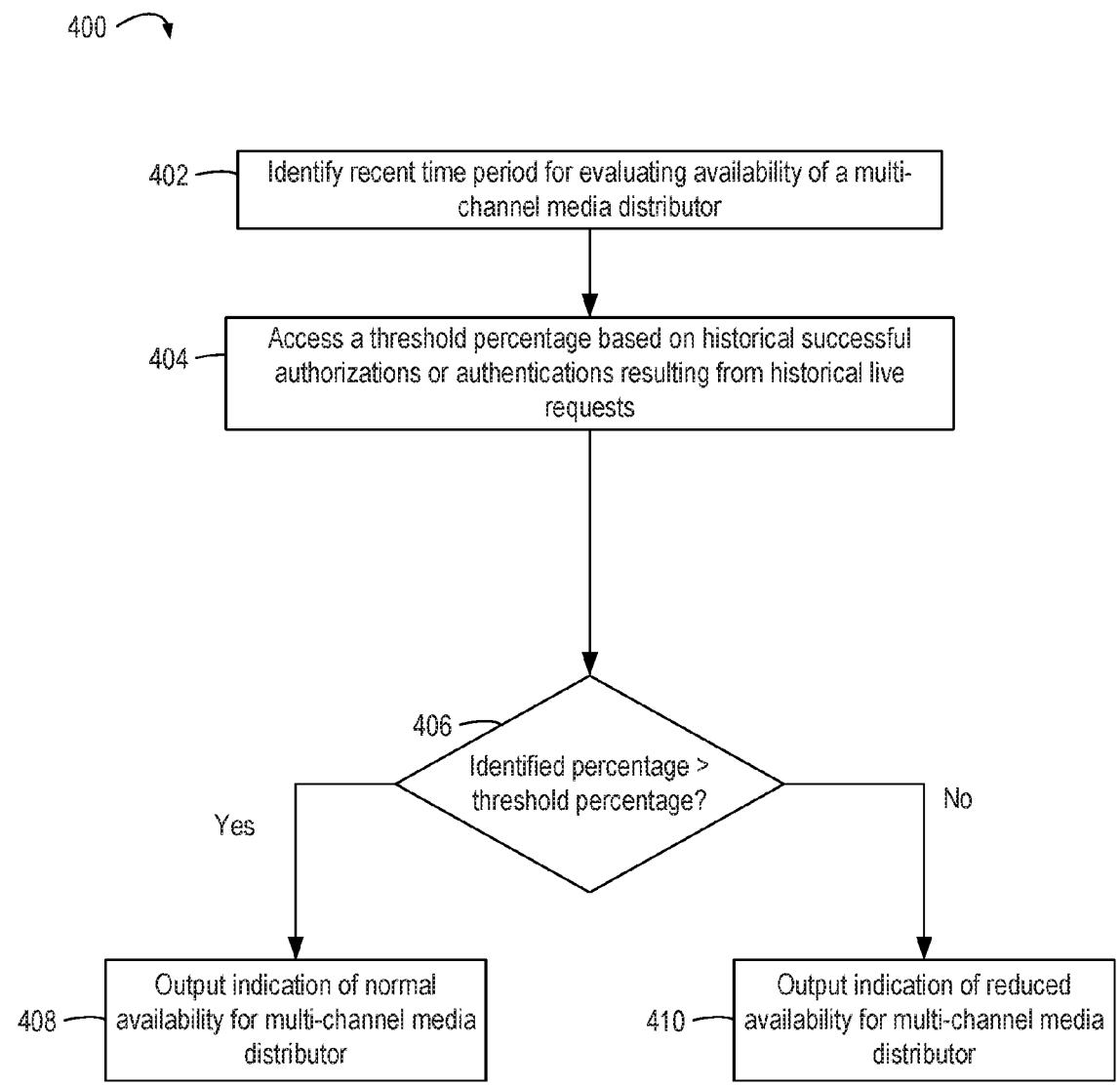
FIG. 4 is a flow chart depicting an example of a process for determining an availability of the multi-channel media distributor using live requests selected for testing the availability of the multi-channel media distributor.

The entitlement service 114 uses any suitable algorithm to determine an availability of the multi-channel media distributor 112. In some embodiments, determining the availability involves, at least partially, using live requests for media content generated by communications between programmers 110 and access enablers 202 executed by user devices. For example, FIG. 4 is a flow chart depicting an example of a process 400 for determining an availability of the multi-channel media distributor 112 using live requests for authentication or authorization. In some embodiments, one or more processing devices implement operations depicted in FIG. 4 by executing suitable program code (e.g., the entitlement service 114 and the availability service 212). For illustrative purposes, the process 400 is described with reference to the examples depicted in FIGS. 1-3. Other implementations, however, are possible.

At block 402, the process 400 involves identifying a percentage of successful authorizations or authentications resulting from live requests to provide media content from one or more programmers to user devices. For example, at least one processing device executes the entitlement service 114 to select a subset of live requests to be used as test requests. The entitlement service 114 configures a suitable network device to transmit the selected request to the multi-channel media distributor 112. The availability service 212 of the entitlement service 114 calculates the percentage of successful authorizations or authentications resulting from the transmitted test requests. In one example, the entitlement service 114 calculates the percentage of successful authorizations or authentications over a testing window of three-to-five minutes.

At block 404, the process 400 involves accessing a threshold percentage based on historical successful authorizations or authentications resulting from historical live requests. For example, at least one processing device executes the entitlement service 114 to access the threshold percentage from a non-transitory computer-readable medium.

In some embodiments, the entitlement service 114 calculates the threshold percentage based on historical data. For instance, the entitlement service 114 accesses records of live requests, which were received from programmers 110, in a database or other suitable data structure in a non-transitory computer-readable medium. The records include time stamps for the live requests and indications of whether the multi-channel media distributor 112 authenticated users or authorized the users' content access in response to the live requests. Examples of these indications include a "success" flag, a "failure" flag, a "time-out" flag, or any other data describing the result of sending authentication or authorization requests to the multi-channel media distributor 112. The entitlement service 114 selects the records for a suitable historical time period (e.g., the most recent month, the most recent day, or the most recent hour). The entitlement service 114 calculates a percentage of the records that indicate a successful authentication or authorization.

At block 406, the process 400 involves determining whether the identified percentage of successful authorizations or authentications for the test requests is greater than the threshold percentage. For example, at least one processing device executes the entitlement service 114 to compare the percentage identified at block 404 and the threshold percentage accessed from the non-transitory computer-readable medium.

If the identified percentage is greater than the threshold percentage, the process 400 involves outputting an indication of normal availability for the multi-channel media distributor, as shown at block 408. For example, at least one processing device executes the availability service 212 to output an indicator of normal availability. The entitlement service 114, based on the indicator of normal availability, forwards subsequent requests for authentication or authorization to the multi-channel media distributor 112, as described herein with respect to block 308 of the process 300.

If the identified percentage is less than the threshold percentage, the process 400 involves outputting an indication of reduced availability for the multi-channel media distributor, as shown at block 410. For example, at least one processing device executes the entitlement service 114 to output an indicator of reduced availability. In some embodiments, the entitlement service 114, based on the indicator of reduced availability, responds to subsequent requests for authentication or authorization (e.g., the messages 204 depicted in FIG. 2) by providing temporary access to media content from the programmers 110 to the user devices 106.

Figure 5:
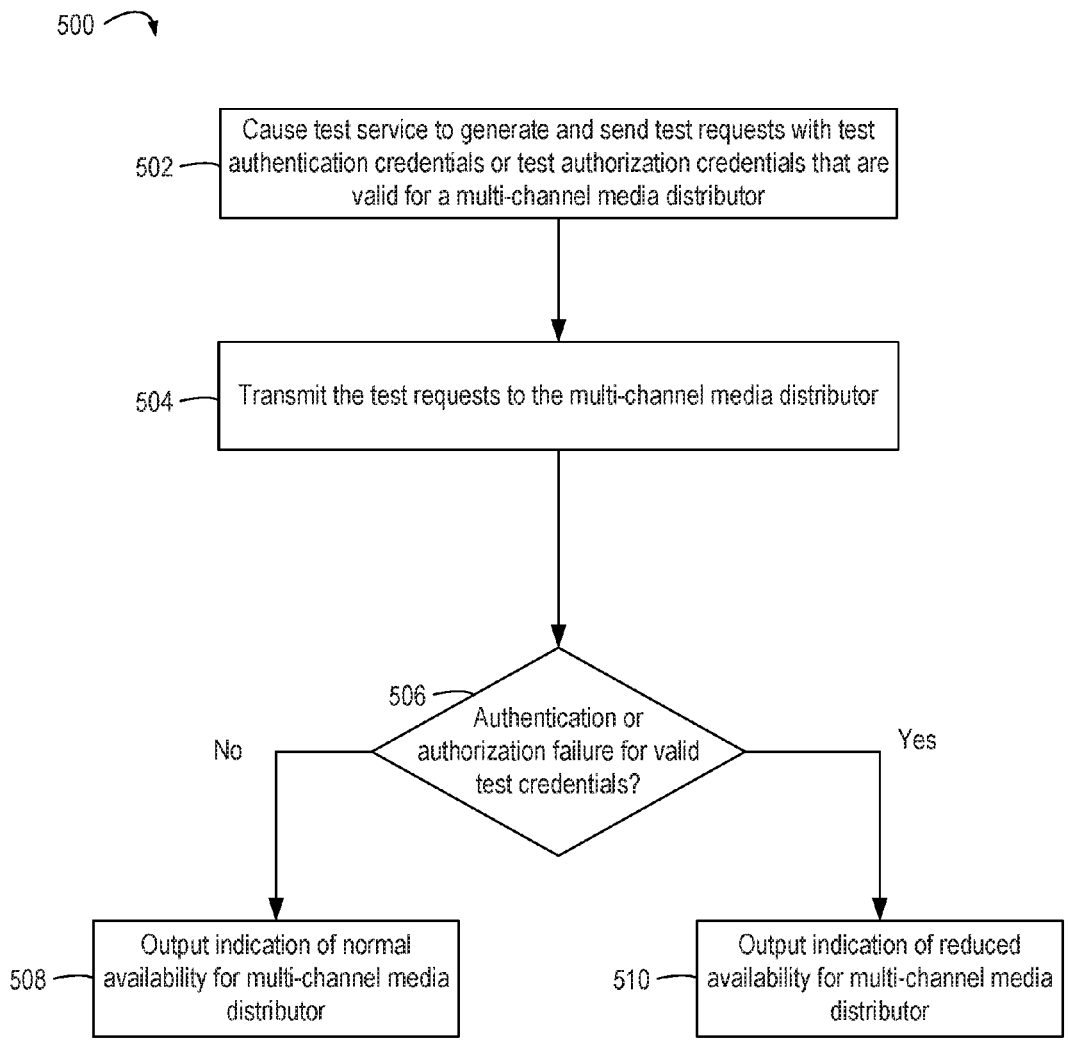
FIG. 5 is a flow chart depicting an example of a process for determining an availability of the multi-channel media distributor using test requests generated for verifying the availability of the multi-channel media distributor.

In additional or alternative embodiments, determining an availability of the multi-channel media provider involves, at least partially, using analytics data generated by the entitlement service 114 for artificial traffic between a testing service and the multi-channel media distributor 112 via the entitlement service 114. For example, FIG. 5 is a flow chart depicting an example of a process 500 for determining an availability of the multi-channel media distributor 112 using test requests generated for verifying the availability of the multi-channel media distributor 112. In some embodiments, one or more processing devices implement operations depicted in FIG. 5 by executing suitable program code (e.g., the entitlement service 114 and the availability service 212). For illustrative purposes, the process 500 is described with reference to the examples depicted in FIGS. 1-4. Other implementations, however, are possible.

At block 502, the process 500 involves causing a test service to generate and send test requests with test authentication credentials or test authorization credentials that are valid for a multi-channel media distributor. For example, at least one processing device executes the entitlement service 114 to cause the test service to generate and send the test requests. The test requests include one or more of test authentication credentials and test authorization credentials that are valid for the multi-channel media distributor. In some embodiments, these test credentials are generated using the entitlement service 114 specifically for verifying the responsiveness of the multi-channel media distributor 112, and are not used by user devices 106. In additional or alternative embodiments, these test credentials are verified user credentials associated with one or more users 102, 104. For example, if certain user credentials received from one or more user devices 106 has resulted in a successful authentication or authorization within a threshold time period (e.g., the most recent day), the test service stores these user credentials as test credentials.

In some embodiments, the test service is executed on a test server 116 that is accessible by the entitlement service 114 via a data network, as described herein with respect to FIG. 3. In other embodiments, the test service is executed on a computing system that also executes the entitlement service 114, as described herein with respect to FIG. 3.

At block 504, the process 500 involves transmitting the test requests to the multi-channel media distributor. For example, at least one processing device executes the entitlement service 114 to transmit the test requests to the multi-channel media distributor 112.

At block 506, the process 500 involves determining if one or more authentication or authorization failures results from transmitting the test requests to the multi-channel media distributor. For example, at least one processing device executes the availability service 212 to determine whether one or more authentication or authorization failures have occurred. The availability service 212 determines that authentication or authorization failures have occurred based on, for example, a specified amount of time elapsing without the entitlement service 114 receiving a responsive message from the multi-channel media distributor 112 indicating a successful authentication or authorization. The lack of a successful authentication or authorization indicates or verifies a reduced availability of the multi-channel media distributor 112 at least because the test credentials included in the test requests are known by the entitlement service 114 to be valid, and therefore should have resulted in a successful authentication or authorization.

If transmitting the test requests does not result in one or more authentication or authorization failures, the process 500 involves outputting an indication of normal availability for the multi-channel media distributor, as shown at block 508. For example, at least one processing device executes the availability service 212 to output an indicator of normal availability. The entitlement service 114, based on the indicator of normal availability, forwards subsequent requests for authentication or authorization to the multi-channel media distributor 112, as described herein with respect to block 310 of the process 300.

If transmitting the test requests results in one or more authentication or authorization failures, the process 500 involves outputting an indication of reduced availability for the multi-channel media distributor, as shown at block 510. For example, at least one processing device executes the entitlement service 114 to output an indicator of reduced availability. In some embodiments, the entitlement service 114, based on the indicator of reduced availability, responds to subsequent requests for authentication or authorization (e.g., the messages 204 depicted in FIG. 2) by providing temporary access to media content from the programmers 110 to the user devices 106.

Determining Reduced Availability of Multi-Channel Media Provider

In some embodiments, prior to the methods described above, the entitlement service 114 automatically identifies a reduced availability of the availability of the multi-channel media distributor 112. For example, the entitlement service 114 transmits multiple messages 216 that include requests for the multi-channel media distributor 112 to authenticate or authorize various users' access to media content provided by programmers 110. The entitlement service 114 can determine how frequently these authentication or authorization requests fail. If these requests are resulting in a percentage of authentication or authorization requests that appears anomalous, the entitlement service 114 determines that the multi-channel media distributor 112 is unavailable (or is at least experiencing a period of reduced availability). Based on this determination, the entitlement service 114 provides or otherwise facilitates temporary access to media content of one or more programmers 110 by one or more user devices 106.

Figure 6:
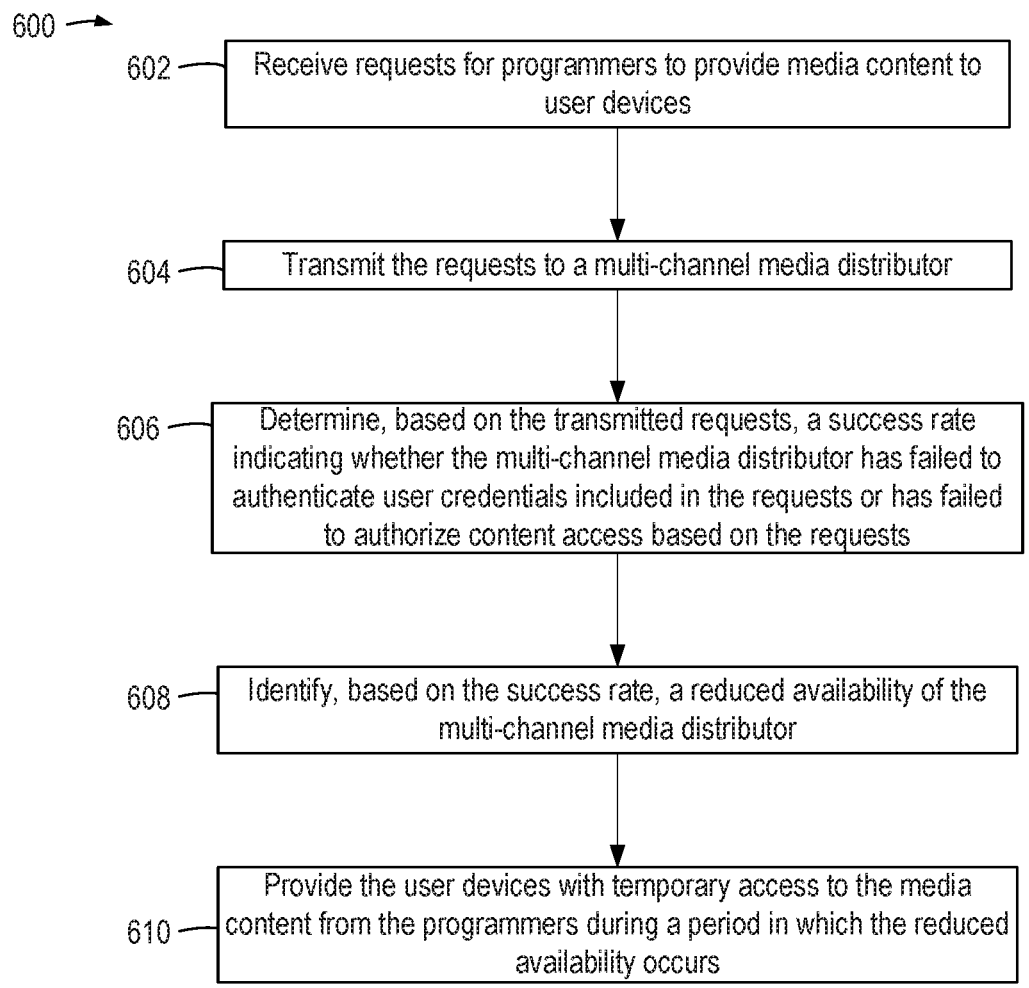
FIG. 6 is a flow chart depicting an example of a process for automatically identifying a reduced availability of a multi-channel media distributor for authentication or authorization.

In such embodiments, the entitlement service 114 executes one or more suitable operations for determining that the multi-channel media distributor 112 is unavailable. For example, FIG. 6 is a flow chart depicting an example of a process 600 for automatically identifying a reduced availability of a multi-channel media distributor 112 for authentication or authorization. In some embodiments, one or more processing devices implement operations depicted in FIG. 6 by executing suitable program code (e.g., the entitlement service 114 and the availability service 212). For illustrative purposes, the process 600 is described with reference to the examples depicted in FIGS. 1-5. Other implementations, however, are possible.

At block 602, the process 600 involves receiving requests for programmers to provide media content to user devices. In some embodiments, the requests received at block 602 are live requests received from computing devices associated with the programmers 110. For example, at least one processing device executes the entitlement service 114 to communicate with multiple programmers 110, with multiple access enablers 202 executed by user devices 106, or both. The entitlement service 114 communicates via, for example, one or more suitable data networks 108. The entitlement service 114 receives, in one or more time periods, multiple requests in multiple messages 204 from multiple programmers 110. Examples of how these messages 204 are generated and transmitted to the entitlement service 114 are described above with respect to the example depicted in FIG. 2.

At block 604, the process 600 involves transmitting the requests to a multi-channel media distributor. For example, at least one processing device executes one or more of the authentication service 210 and the authorization service 211 of the entitlement service 114. In the example depicted above with respect to FIG. 2, executing the authentication service 210, the authorization service 211, or both configures the processing device to generate messages 216, which include requests for authentication or authorization with user credentials (e.g., user names and passwords) provided to the entitlement service 114 by access enablers. The entitlement service 114 transmits the requests to the multi-channel media distributor 112 via one or more suitable data networks 108.

At block 606, the process 600 involves determining, based on the transmitted requests, a success rate indicating whether the multi-channel media distributor has failed to authenticate user credentials included in the requests or has failed to authorize content access based on the requests. For example, at least one processing device executes the availability service 212 of the entitlement service 114 to determine the responsiveness of the multi-channel media distributor 112 to the transmitted requests. The entitlement service 114 determines the responsiveness based on whether the transmitted requests result in successful authentication of credentials included in the requests, successful authorization of content access based on credentials included in the requests, or both.

For example, this can be based on the entitlement service waiting for a predetermined amount of time to pass without receiving a response. In an alternative embodiment, the entitlement service determines that the multi-channel media distributor is not available based on a history of communications with the multi-channel media distributor 112, statistics regarding the multi-channel media distributor 112, or both. The history or statistics include information about attempts to contact the multi-channel media distributor 112 on behalf of multiple, different programmers in one embodiment. Because information for multiple programmers is used, multi-channel media distributor issues are identified faster and more accurately than they otherwise would be identified.

In embodiments involving live requests, which are transmitted by the access enablers 206a at programmers 110 based on communications with access enablers 206b at user devices 106, the entitlement service 114 determines the responsiveness by comparing a success rate for a recent time period with a success rate for an historical time period. For example, the entitlement service 114 stores records of received live requests in a non-transitory computer-readable medium using a database or other suitable data structure. The records can include time stamps for the live requests and indications of whether the multi-channel media distributor 112 authenticated users or authorized the users' content access. Examples of these indications include a "success" flag, a "failure" flag, a "time-out" flag, or any other data describing the result of sending authentication or authorization requests to the multi-channel media distributor 112.

In some embodiments, the entitlement service may execute one or more operations of process 400 when using test credentials to determine the availability of the multi-channel media provider. For example, as described herein with respect to FIG. 4, if a recent success rate deviates from an historical success rate, the entitlement service 114 determines that the multi-channel media distributor 112 is experiencing reduced availability.

In additional or alternative embodiments, the requests used in blocks 602, 604, and 606 are test requests that are generated or used for the purpose of checking the availability of the multi-channel media distributor 112. For example, a processing device can execute the entitlement service 114 to communicate with a separate test server 116 or a testing service executed at the same computing system as the entitlement service 114. The entitlement service 114 causes the test server 116 or a testing service to generate and send test requests with test credentials known to be valid. The entitlement service 114 uses the test credentials to determine the availability of the multi-channel media distributor. For example, the entitlement service may execute one or more operations of process 500 when using test credentials to determine the availability of the multi-channel media provider.

At block 608, the process 600 involves identifying, based on the success rate, a reduced availability of the multi-channel media distributor. For example, at least one processing device executes the availability service 212 of the entitlement service 114 to identify a reduced availability of the multi-channel media distributor 112. In some embodiments, the entitlement service 114 determines the reduced availability based on a success rate during a recent time period being below a threshold success rate determined from historical data. In other embodiments, the entitlement service 114 determines the reduced availability based on a low success rate associated with sending test requests, which have credentials known to be valid, to the multi-channel media distributor 112.

At block 610, the process 600 involves providing the user devices with temporary access to the media content from the programmers during a period in which the reduced availability occurs. For example, at least one processing device executes the token service 214 or other suitable program code of the entitlement service 114 to provide user devices 106 with temporary access to media content from one or more of the programmers. Examples of the entitlement service 114 providing temporary access to the media content are described herein with respect to FIGS. 7 and 8.

In some embodiments, the entitlement service 114 combines the operations depicted in FIGS. 4 and 5 to identify a reduced availability of the multi-channel media distributor 112. For example, the entitlement service 114 may first use real-time traffic, as depicted in FIG. 4, to make an initial determination of reduced availability. If executing the process 400 results in outputting an indication of reduced availability, the entitlement service may then execute the process 500 based on the indication of reduced availability being outputted. The process 500 uses the test requests to verify whether the indication of reduced availability generated using the process 400 resulted from a lack of responsiveness by the multi-channel media distributor 112 (e.g., if the test requests result in an authentication or authorization failure) or a large number of invalid live requests (e.g., if the test requests result in an authentication or authorization success).

In some embodiments, the entitlement service 114 uses analytics data for one or more specific programmers 110 to determine a reduced availability of the multi-channel media distributor 112. In one example, the entitlement service 114 may execute process 400 when determining an availability of the multi-channel media distributor 112, and may use the success rate for a given programmer 110 at block 402 and may use historical data for that programmer to determine the threshold percentage accessed at block 404. In another example, the entitlement service 114 may use the success rate for a given programmer 110 at block 402 and may use historical data for all programmers to determine the threshold percentage accessed at block 404. In other embodiments, the entitlement service 114 uses analytics data for multiple programmers 110 (and possibly all programmers 110) to determine the reduced availability of the multi-channel media distributor 112.

Providing Temporary Access to Media Content

As discussed above, in certain cases, the entitlement service 114 grants temporary access to media content based on determining that the multi-channel media distributor is unable to respond or has experienced reduced availability. This can involve providing a token to the user that includes a time-to-live parameter that limits the useful life of the token and thus limits the duration of the temporary access. The entitlement service, in one embodiment, applies a programmer-specific rule to grant the temporary access to the user to access the video from the programmer while waiting for the multi-channel media distributor.

In some embodiments, depending on the type of video, programmer, or other circumstances, a system that includes the entitlement service 114 allows authentication, authorization, or both to be bypassed according to particular rules. One example of these rules is an "authenticate all" rule that allows all users (even those who have not previously authenticated with the system) to be granted access for a period of time, e.g., using a token. Another example of these rules is an "authorize all" rule that allows only users who have previously authenticated with the system to be granted access for a period of time. Previously authenticated users are given temporary access to all videos for a particular programmer that implements this rule. Another exemplary rule is an "authorize none" rule that allows a programmer to identify particular channel(s) that users will not have access to when the multi-channel media distributor is unavailable. In one example, this type of channel-specific control is useful to a programmer offering a basic channel and a premium access channel who implements the rule to avoid giving access to the premium access channel during multi-channel media distributor unavailability.

In some embodiments, degradation rules are used to control or provide temporary access to media content from one or more programmers 110. For example, a programmer 110 can configure the entitlement service 114 to implement degradation rules in a pipeline mode (e.g., applying the rules one after another). As a specific example, if the entitlement service 114 has been used to grant temporary access on two sports channels in an native application provided by a given programmer, the "authenticate all" rule is configured to take precedence, and the user will not be asked to enter a user name and password when attempting to access another video using the provider native application. The pipeline specifies rules based on different scenarios and can be the implementation of a logical construct inside an execution block that interprets the rules. In other embodiments, operations that do not use degradation rules may be used if the multi-channel media distributor experiences reduced availability.

Figure 7:
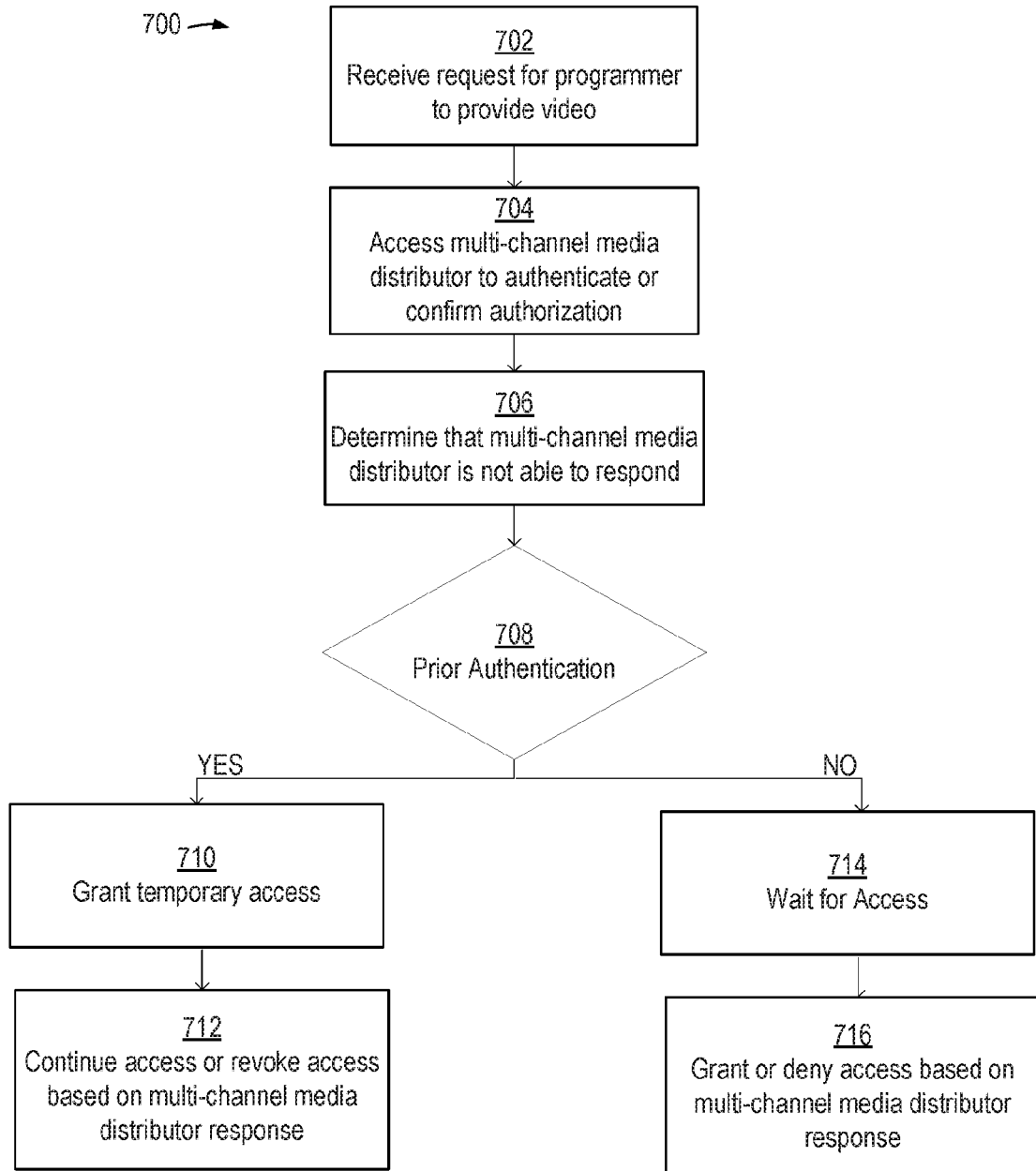
FIG. 7 is a flow chart illustrating an example of a method for granting temporary access when a multi-channel media distributor is unavailable based on a rule.

FIG. 7 is a flow chart illustrating an exemplary process 700 for granting temporary access when the multi-channel media distributor is unavailable based on a rule. Process 700 is provided in an environment in which a programmer provides video content to users based on the users having subscriptions with a separate multi-channel media distributor. FIG. 7 provides an example of application of an "authorize all" rule.

In process 700, a request for a programmer to provide a video is received in block 702, a multi-channel media distributor is accessed to authenticate or confirm authorization in block 704, and the process 700 determines that the multi-channel media distributor is not able to respond as shown in block 706.

In decision block 708, process 700 determines whether the user has previously authenticated with the multi-channel media distributor. This determination is made by a service, such as entitlement service 114 of FIG. 2, separate from the multi-channel media distributor. To make the determination, the service maintains records of prior user authentications with particular multi-channel media distributors for particular programmers.

If the user has previously authenticated with the multi-channel media distributor, the process 700 grants temporary access to the user, as shown in block 710. When a subsequent response is received from the multi-channel media distributor, the process 700 continues access or revokes access to the video based on the subsequent response, as shown in block 712.

If the user has not previously authenticated with the multi-channel media distributor, the process 700 does not grant access (and thus withholds access to the video) while waiting for a response from the multi-channel media distributor, as shown in block 714. When a subsequent response is received from the multi-channel media distributor, the process 700 grants access based on the subsequent response, as shown in block 716.

Figure 8:
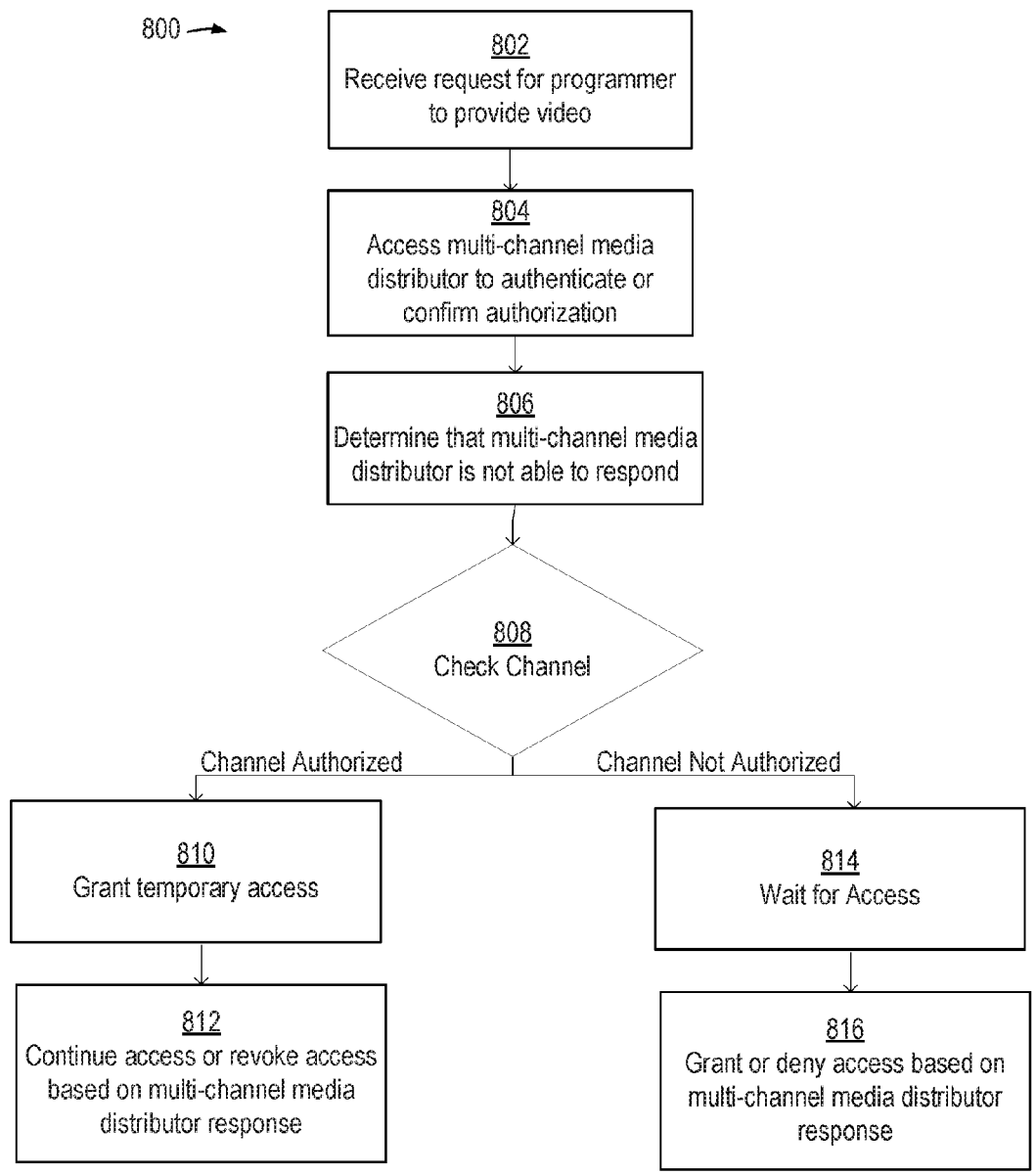
FIG. 8 is a flow chart illustrating an exemplary method for granting temporary access when a multi-channel media distributor is unavailable based on a channel-specific rule.
Figure 9:
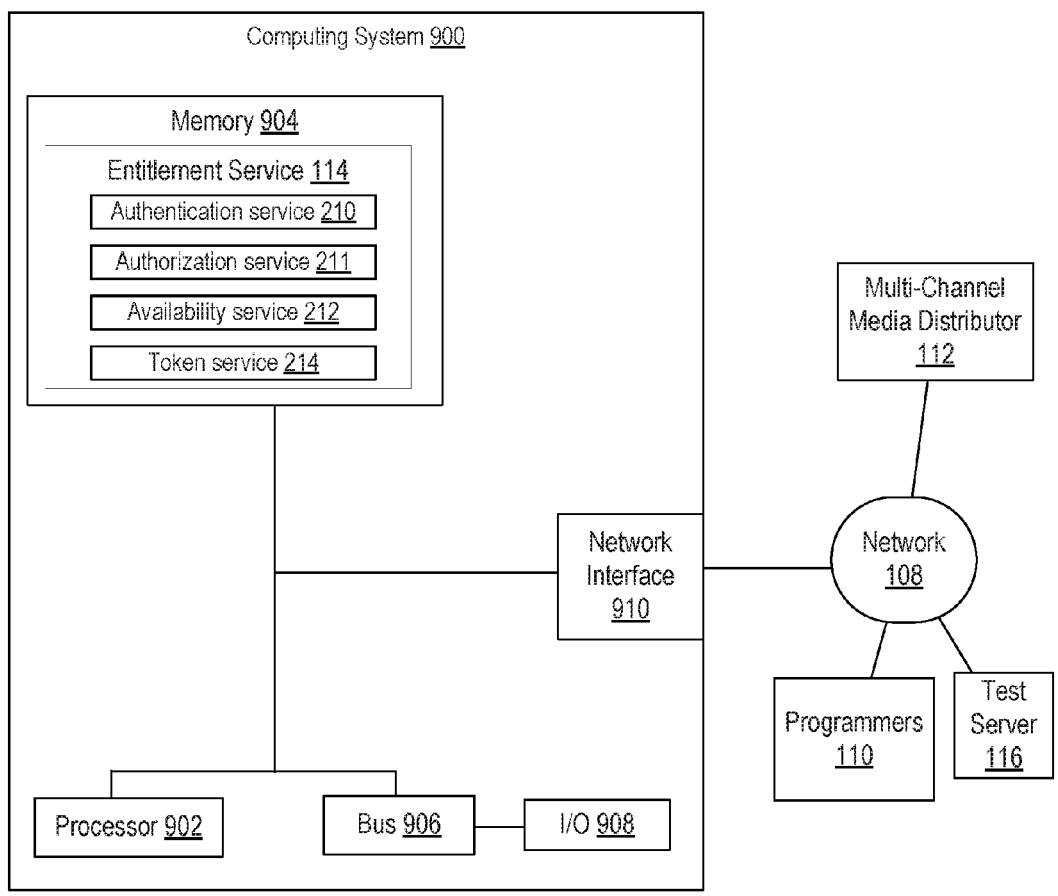
FIG. 9 is a block diagram depicting an example of a computing system used to implement certain embodiments.

FIG. 8 is a flowchart illustrating an exemplary process 800 for granting temporary access when the multi-channel media distributor is unavailable based on a channel-specific rule. Process 800 is provided in an environment in which a programmer provides video content to users based on the users having subscriptions with a separate multi-channel media distributor. FIG. 8 provides an example of applying a channel-specific "authorize none" rule.

In process 800, a request for a programmer to provide a video is received in block 802, a multi-channel media distributor is accessed to authenticate or confirm authorization in block 804, and the process 800 determines that the multi-channel media distributor is not able to respond as shown in block 806.

In decision block 808, process 800 determines whether a channel associated with the requested video is authorized or not authorized. This determination is made by a service, such as entitlement service 114 of FIG. 2, separate from the multi-channel media distributor. To make the determination, the service maintains records of publisher channel preferences.

If the channel is authorized, the process 800 grants temporary access to the user, as shown in block 810. When a subsequent response is received from the multi-channel media distributor, the process 800 continues access or revokes access to the video based on the subsequent response, as shown in block 812.

If the channel is not authorized, the process 800 does not grant access (and thus withholds access to the video) while waiting for a response from the multi-channel media distributor, as shown in block 814. When a subsequent response is received from the multi-channel media distributor, the process 800 grants access based on the subsequent response, as shown in block 816.

Exemplary Computing Environment

Any suitable computing system or group of computing systems can be used for performing the operations described herein. For example, FIG. 10 is a block diagram depicting an example of a computing system 1000 that executes an entitlement service for determining an availability of a multi-channel media distributor 112.

The depicted example of the computing system 1000 includes one or more processors 1002 communicatively coupled to one or more memory devices 1004. The processor 1002 executes computer-executable program code, accesses information stored in the memory device 1004, or both. Examples of processor 1002 include a microprocessor, an application-specific integrated circuit ("ASIC"), a field-programmable gate array ("FPGA"), or other suitable processing device. The processor 1002 can include any number of processing devices, including one.

The memory device 1004 includes any suitable non-transitory computer-readable medium for storing the authentication service 210, the authorization service 211, the availability service 212, and the token service 214. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1000 may also include a number of external or internal devices such as input or output devices. For example, the computing system 1000 is shown with an input/output ("I/O") interface 1008 that can receive input from input devices or provide output to output devices. A bus 1006 can also be included in the computing system 1000. The bus 1006 can communicatively couple one or more components of the computing system 1000.

The computing system 1000 executes program code that configures the processor 1002 to perform one or more of the operations described above with respect to FIGS. 1-9. The program code includes, for example, one or more of the authentication service 210, the authorization service 211, the availability service 212, the token service 214, or other suitable applications that perform one or more operations described herein. The program code may be resident in the memory device 1004 or any suitable computer-readable medium and may be executed by the processor 1002 or any other suitable processor. In some embodiments, the program code described above and data used for determining availability of the multi-channel media distributor 112 (e.g., test credentials, analytics data, etc.) are stored in the memory device 1004. In additional or alternative embodiments, one or more of the program code described above and data used for determining availability of the multi-channel media distributor 112 (e.g., test credentials, analytics data, etc.) are stored in one or more memory devices accessible via a data network 108, such as a memory device accessible via a cloud service.

The computing system 1000 depicted in FIG. 10 also includes at least one network interface 1010. The network interface 1010 includes any device or group of devices suitable for establishing a wired or wireless data connection to one or more data networks 108. Non-limiting examples of the network interface 1010 include an Ethernet network adapter, a modem, and other suitable transceivers. The computing system 1000 is able to communicate with one or more online programmers 110, one or more multi-channel media distributors 112, and (in some embodiments) one or more test servers 116 using the network interface 1010.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method comprising:
   diverting, by an entitlement service, first requests from reaching a multi-channel media distributor, wherein the first requests are used to cause programmers associated with the multi-channel media distributor to provide first media content to first user devices;
   transmitting, subsequent to diverting at least some of the first requests, test requests from the entitlement service to the multi-channel media distributor;
   determining, by the entitlement service, that the multi-channel media distributor has authenticated user credentials included in the test requests or has authorized content access based on the test requests; and
   transmitting, from the entitlement service to the multi-channel media distributor, second requests for the programmers to provide second media content to second user devices, wherein the second requests are transmitted to the multi-channel media distributor based on determining that the multi-channel media distributor has authenticated the user credentials or has authorized the content access, wherein transmitting the second requests comprises:
      transmitting, during a first time period after determining that the multi-channel media distributor has authenticated the user credentials or has authorized the content access, a first percentage of requests for the programmers to provide media content to the multi-channel media distributor and diverting other requests received during the first time period, and
      transmitting, during a second time period after the first time period, a second percentage of requests received during the second time period to the multi-channel media distributor and diverting other requests received during the second time period, wherein the second percentage is larger than the first percentage and the second percentage of requests is transmitted based on a threshold number of the first percentage of requests resulting in authorization or authentication by the multi-channel media distributor.

2. The method of claim 1, wherein the entitlement service provides a subset of the first user devices with temporary access to the first media content from the programmers based on receiving a subset of the first requests,
   wherein the entitlement service uses the subset of the first requests as the test requests.

3. The method of claim 1, wherein the first requests and the second requests are received via a data network from computing devices associated with the programmers,
 wherein the method further comprises causing, prior to receiving the requests, a test server to transmit the test requests via the data network to the entitlement service, wherein the test requests are generated for verifying an availability of the multi-channel media distributor.

4. The method of claim 1, wherein the second requests comprises fewer than all requests for the programmers to provide media content to user devices, wherein the requests are received by the entitlement service subsequent to the first requests being diverted.

5. The method of claim 1, wherein diverting the first requests from the multi-channel media distributor comprises:
 determining that the first requests are for the multi-channel media distributor to authenticate the first user devices for the programmers or to verify that the first user devices are authorized to access media content; and
 providing, by the entitlement service, the first user devices with temporary access to the first media content from the programmers based on the multi-channel media distributor having reduced availability prior to the entitlement service receiving the first requests.

6. The method of claim 1, wherein providing the first user devices with temporary access to the first media content comprises generating access tokens with time-to-live indicators and transmitting the access tokens to the first user devices,
 wherein the method further comprises:
  receiving additional requests for at least some of the programmers to provide media content to at least some of the user devices subsequent to the time-to-live indicators expiring, and
  transmitting the additional requests to the multi-channel media distributor based at least partially on determining that the multi-channel media distributor has authenticated the user credentials or has authorized the content access.

7. A system comprising:
 a processing device;
 a network interface device communicatively coupled to the processing device; and
 a non-transitory computer-readable medium communicatively coupled to the processing device and storing program code that comprises an entitlement service,
 wherein the processing device is configured for executing the stored program code and thereby performing operations comprising:
  diverting first requests from reaching a multi-channel media distributor, wherein the first requests are used to cause programmers associated with the multi-channel media distributor to provide first media content to first user devices,
  configuring the network interface device to transmit, subsequent to diverting at least some of the first requests, test requests to the multi-channel media distributor,
  determining that the multi-channel media distributor has authenticated user credentials included in the test requests or has authorized content access based on the test requests, and
  configuring the network interface device to transmit, to the multi-channel media distributor, second requests for the programmers to provide second media content to second user devices, wherein the second requests are transmitted to the multi-channel media distributor based on determining that the multi-channel media distributor has authenticated the user credentials or has authorized the content access, and wherein configuring the network interface to transmit the second requests comprises:
   configuring the network interface to transmit, during a first time period after determining that the multi-channel media distributor has authenticated the user credentials or has authorized the content access, a first percentage of requests for the programmers to provide media content to the multi-channel media distributor and diverting other requests received during the first time period, and
   configuring the network interface to transmit, during a second time period after the first time period, a second percentage of requests received during the second time period to the multi-channel media distributor and diverting other requests received during the second time period, wherein the second percentage is larger than the first percentage and the second percentage of requests is transmitted based on a threshold number of the first percentage of requests resulting in authorization or authentication by the multi-channel media distributor.

8. The system of claim 7, wherein the operations further comprise providing a subset of the first user devices with temporary access to the first media content from the programmers based on receiving a subset of the first requests,
 wherein processing device is further configured for using the subset of the first requests as the test requests.

9. The system of claim 7, wherein the network interface device is configured for receiving the first requests and the second requests via a data network from computing devices associated with the programmers,
 wherein the operations further comprise causing, prior to receiving the requests, a test server to transmit the test requests via the data network to the entitlement service, wherein the test requests are generated for verifying an availability of the multi-channel media distributor.

10. The system of claim 7, wherein the second requests comprises fewer than all requests for the programmers to provide media content to user devices.

11. The system of claim 7, wherein diverting the first requests from the multi-channel media distributor comprises:
 determining that the first requests are for the multi-channel media distributor to authenticate the first user devices for the programmers or to verify that the first user devices are authorized to access media content; and
 providing the first user devices with temporary access to the first media content from the programmers based on the multi-channel media distributor having reduced availability prior to the entitlement service receiving the first requests.

12. The system of claim 7, wherein providing the first user devices with temporary access to the first media content comprises generating access tokens with time-to-live indicators and transmitting the access tokens to the first user devices,
 wherein the operations further comprise:
  receiving additional requests for at least some of the programmers to provide media content to at least some of the user devices subsequent to the time-to-live indicators expiring, and transmitting the additional requests to the multi-channel media distributor based at least partially on determining that the multi-channel media distributor has authenticated the user credentials or has authorized the content access.

13. A non-transitory computer-readable medium having program code executable by a processing device stored thereon, the program code comprising:

program code for diverting first requests from reaching a multi-channel media distributor, wherein the first requests are used to cause programmers associated with the multi-channel media distributor to provide first media content to first user devices;

program code for transmitting, subsequent to diverting at least some of the first requests, test requests to the multi-channel media distributor;

program code for determining that the multi-channel media distributor has authenticated user credentials included in the test requests or has authorized content access based on the test requests; and program code for transmitting, to the multi-channel media distributor, second requests for the programmers to provide second media content to second user devices, wherein the second requests are transmitted to the multi-channel media distributor based on determining that the multi-channel media distributor has authenticated the user credentials or has authorized the content access, wherein transmitting the second requests comprises:

transmitting, during a first time period after determining that the multi-channel media distributor has authenticated the user credentials or has authorized the content access, a first percentage of requests for the programmers to provide media content to the multi-channel media distributor and diverting other requests received during the first time period, and transmitting, during a second time period after the first time period, a second percentage of requests received during the second time period to the multi-channel media distributor and diverting other requests received during the second time period, wherein the second percentage is larger than the first percentage and the second percentage of requests is transmitted based on a threshold number of the first percentage of requests resulting in authorization or authentication by the multi-channel media distributor.

14. The non-transitory computer-readable medium of claim 13, wherein the program code further comprises:

program code for providing a subset of the first user devices with temporary access to the first media content from the programmers based on receiving a subset of the first requests; and program code for using the subset of the first requests as the test requests.

15. The non-transitory computer-readable medium of claim 13, wherein the program code further comprises program code for causing, prior to receiving the requests, a test server to transmit the test requests, wherein the test requests are generated for verifying an availability of the multi-channel media distributor.

16. The non-transitory computer-readable medium of claim 13, wherein diverting the first requests from the multi-channel media distributor comprises:

determining that the first requests are for the multi-channel media distributor to authenticate the first user devices for the programmers or to verify that the first user devices are authorized to access media content; and providing the first user devices with temporary access to the first media content from the programmers based on the multi-channel media distributor having reduced availability prior to receiving the first requests.

17. The non-transitory computer-readable medium of claim 13, wherein providing the first user devices with temporary access to the first media content comprises generating access tokens with time-to-live indicators and transmitting the access tokens to the first user devices, wherein the program code further comprises:

program code for receiving additional requests for at least some of the programmers to provide media content to at least some of the user devices subsequent to the time-to-live indicators expiring, and program code for transmitting the additional requests to the multi-channel media distributor based at least partially on determining that the multi-channel media distributor has authenticated the user credentials or has authorized the content access.

* * * * *